United States Patent
Chenot et al.

(10) Patent No.: US 7,014,793 B2
(45) Date of Patent: Mar. 21, 2006

(54) METHOD OF MAKING ELECTROLUMINESCENT PHOSPHOR USING SONOCHEMISTRY

(75) Inventors: Charles F. Chenot, Towanda, PA (US); Judy A. Belinski-Wolfe, Towanda, PA (US); Fuquiang Huang, Towanda, PA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 0 days.

(21) Appl. No.: 11/208,283

(22) Filed: Aug. 19, 2005

(65) Prior Publication Data

US 2006/0017042 A1    Jan. 26, 2006

Related U.S. Application Data

(63) Continuation of application No. 10/435,438, filed on May 9, 2003, now abandoned.

(60) Provisional application No. 60/385,095, filed on May 31, 2002.

(51) Int. Cl.
*C09K 11/56* (2006.01)
*C09K 11/54* (2006.01)

(52) U.S. Cl. .............................. 252/301.6 S
(58) Field of Classification Search ...................... None
See application file for complete search history.

(56) References Cited

U.S. PATENT DOCUMENTS

| | | | |
|---|---|---|---|
| 2,745,811 A | 5/1956 | Butler et al. | 252/301.6 |
| 2,957,830 A | 10/1960 | Goldberg et al. | 252/301.6 |
| 3,076,767 A | 2/1963 | Faria et al. | 252/301.6 |
| 3,082,344 A | 3/1963 | Thornton et al. | 313/108 |
| 4,859,361 A | 8/1989 | Reilly et al. | 252/301.6 S |
| 5,643,496 A | 7/1997 | Brese et al. | 252/301.65 |
| 5,702,643 A | 12/1997 | Reddy et al. | 252/301.65 |
| 5,711,898 A | 1/1998 | Reddy et al. | 252/301.65 |
| 6,143,201 A | 11/2000 | Mano | 252/301.6 |

FOREIGN PATENT DOCUMENTS

| | | |
|---|---|---|
| JP | 02-094287 | 4/1990 |
| JP | 09-059616 | 3/1997 |
| WO | WO 91/16722 | 10/1991 |

OTHER PUBLICATIONS

S. Ostapenko, *Defect Passivation using ultrasound treatment: fundamentals and application*, Appl. Phys. A, 69, 225-232 (1999).

(Continued)

*Primary Examiner*—C. Melissa Koslow
(74) *Attorney, Agent, or Firm*—Robert F. Clark

(57) ABSTRACT

A method of making zinc sulfide based electroluminescent phosphors is described wherein a first-fired zinc sulfide material having a hexagonal β-ZnS crystal structure is at least partially converted to a distorted hexagonal β-ZnS crystal structure by ultrasonic irradiation. The first-fired material is then fired at a lower temperature to form an electroluminescent phosphor.

14 Claims, 5 Drawing Sheets

OTHER PUBLICATIONS

J.L. Gillson and F.J. Darnell, *Electroluminescence in Zinc Sulfide*, Physical Review, 125 (1) 149-158 (1962).

A.G. Fischer, *Electroluminescent Lines in ZnS Powder Particles, I. Embedding Media and Basic Observations*, J. Electrochemical Soc., 109 (11) 1043-1049 (1962).

A.G. Fischer, *Electroluminescent Lines in ZnS Powder Particles, II. Models and Comparison with Experience*, J. Electrochemical Soc., 110 (7) 733-748 (1963).

P. Goldberg, *Luminescence of Inorganic Solids, Ch. 10, Electroluminescence in II-VI Compounds*, 533-602, Academic Press (1966).

*Binary Alloy Phase Diagrams*, 2nd Ed., vol. 3, 3297 and 3298, ASM International (1990).

R.D. Cullity, *Elements fo X-ray Diffraction*, 262-267, 430-437, and 446-447, Addison-Wesley (1967).

*Phosphor Handbook*, Ch. 9, Sec. 2, 601-612, CRC Press (1999).

METHOD OF MAKING ELECTROLUMINESCENT PHOSPHOR USING SONOCHEMISTRY

CROSS-REFERENCE TO RELATED APPLICATIONS

This application is a continuation of application Ser. No. 10/435,438, filed May 9, 2003, ABN., which claims the benefit of U.S. Provisional Application No. 60/385,095, filed May 31, 2002.

TECHNICAL FIELD

The present invention relates to methods for producing zinc sulfide-based electroluminescent phosphors. More particularly, this invention relates to methods for inducing defects in the crystallographic structure of zinc sulfide to promote electroluminescence.

BACKGROUND OF THE INVENTION

Electroluminescent (EL) phosphors are incorporated into numerous thick-film, alternating-current, EL display devices. One particularly important class of EL phosphors is the copper-activated zinc sulfide phosphors which include the commercially important ZnS:Cu,Cl and ZnS:Cu,Mn,Cl phosphors. In the manufacturing of these ZnS-based phosphors reference is typically made to at least a two-step firing procedure involving some kind of intermediate comminution or chemical treatment step between the two firing steps. For example, U.S. Pat. No. 2,745,811 teaches a synthesis method involving double firing with a re-mixing between the firing steps and U.S. Pat. No. 2,957,830 teaches a synthesis method involving a first-step firing at high temperatures, followed by light crushing of the material, and then a lower temperature second-step firing. U.S. Pat. No. 3,076,767 teaches a synthesis method involving a first-step firing at high temperatures, followed by a hydrogen peroxide etching step, and then by a low-temperature second-step firing. U.S. Pat. No. 3,082,344 (1963) teaches a two-step firing process wherein the first-step firing is conducted in a sulphurizing atmosphere at a high temperature, followed by a second-step firing (baking) at a lower temperature in an oxygen or air atmosphere, and then a subsequent cooling step involving rapid quenching in an air atmosphere.

More recently, attention has been focused on intermediate steps involving the application of mechanical force to the material from the first-step firing. For example, U.S. Pat. No. 4,859,361 teaches a synthesis method involving a first-step firing at high temperatures followed by a low-intensity milling step designed to change the crystallographic structure of at least a portion of the material. After the low-intensity milling, the material is subjected to a low-temperature, second- step firing to form the phosphor. In a similar manner, U.S. Pat. No. 5,643,496 teaches a synthesis method involving a first-step firing at high temperatures followed by a low-intensity milling (or mulling) step designed to convert some of the hexagonal ZnS to its cubic crystalline form and then by subsequent low-temperature second-step firing. Comparable methods are also disclosed in U.S. Pat. Nos. 5,702,643 and 5,711,898. In Japanese Patent Application 02-094287, the mechanical force is applied through isostatic pressing. In particular, the synthesis method involves a plurality of steps including a first-step firing followed by isostatic pressing of the intermediate material at between 200 to 2000 $kg/cm^2$ and then by a low temperature annealing. In Japanese Patent Application 09-059616, an impact force is applied to the particles by causing accelerated particles to collide with one another, e.g., jet milling.

The application of an intermediate mechanical force coupled with a low temperature second-step firing is thought to contribute to the development of line-shaped or stria-like crystal imperfections, also referred to as crystal stacking faults, that are associated with the luminescent lines or striae observed with EL phosphors. These luminescent lines, luminescent striae, and/or comet-like luminescent sites are critical parts of the observations by Gillson and Darnell, Phys. Rev. 125, 149 (1962), and the electroluminescence models developed by A. G. Fischer. See, e.g., A. G. Fischer, J. Electrochem. Soc. 109 (11), 1043–1049 (1962); A. G. Fischer, J. Electrochem. Soc., 110 (7), 733–747 (1963); and A. G. Fischer, *Luminescence of Inorganic Solids*, edited by Paul Goldberg, Academic Press, Yew York, chapter 10, 541–601 (1966). Much of this prior art is reviewed in the *Phosphor Handbook*, edited by S. Shionoya and W. Yen, CRC Press, NY, Chapter 9 (section two), 601–612 (1999).

SUMMARY OF THE INVENTION

Sonochemistry is the science of using the acoustic energy in ultrasound to bring about physical and chemical changes. Ultrasound is broadly defined as sound having a frequency above about 18–20 kHz (the upper limit of human hearing) to about 100 MHz. High frequency ultrasound above 5 MHz is used for medical imaging and is generally not useful for sonochemistry since it does not produce cavitation in liquids, the source of chemical effects.

We have discovered that it is possible to apply the principles of sonochemistry to the synthesis of zinc sulfide-based electroluminescent phosphors. In particular, the present invention applies sonochemistry in order to generate a controlled population of the crystal stacking faults that are associated with the luminescent lines or striae observed with EL phosphors. The identifiable crystallographic structural changes that occur as a result of sonochemistry processing appear to be related to crystalline microstructural changes associated with a partial conversion of hexagonal ZnS to a distorted hexagonal crystalline form. The structural changes are a function of the ultrasound power (intensity) introduced.

In accordance with one aspect of the invention, there is provided a method of making zinc sulfide-based electroluminescent phosphors, comprising:
a) firing a mixture of zinc sulfide, at least one activator, and a flux to form a first-fired material having a hexagonal β-ZnS crystal structure;
b) suspending the first-fired material in a liquid medium;
c) at least partially converting the crystal structure of the first-fired material to a distorted hexagonal β-ZnS form by ultrasonic irradiation of the suspension; and
d) firing the at least partially converted first-fired material to form an electroluminescent phosphor.

DETAILED DESCRIPTION OF THE INVENTION

For a better understanding of the present invention, together with other and further objects, advantages, and capabilities thereof, reference is made to the following disclosure and appended claims taken in conjunction with the above-described drawings.

Zinc sulfide is essentially stoichiometric and exists in two polymorphic forms, namely cubic low-temperature α-ZnS (sphalerite, space group F$\bar{4}$3m) and hexagonal high-temperature β-ZnS (wurtzite, space group P6$_3$mc). The phase inversion between α and β forms is reported to occur at 1020° C. The method of this invention uses the acoustic energy from the ultrasound to cause a partial change in the hexagonal high-temperature β-ZnS form to a distorted hexagonal crystalline form. The change brought about by the sonochemical processing is associated with non-uniform strain or microstress, also referred to as residual stress or process-induced stress. These terms emphasize the fact that the stress remains after all external forces are removed. This distortion in the hexagonal form is identifiable by x-ray diffraction line broadening measurement techniques (e.g., differentiation of the Bragg law).

In one embodiment, zinc sulfide-based electroluminescent phosphors are formed in a two-step firing method wherein the ultrasonic irradiation occurs between firings. In particular, the method begins by combining zinc sulfide, at least one activator source, and a flux to form a mixture. Typical activators include: Cu, Cl, Mn, Au, Mg, I, Br, and F. Sources for these activators include compounds such as chlorides, bromides, iodides, fluorides, carbonates, sulfates, e.g., $CuSO_4$, AuCl, $MnCO_3$, $ZnCl_2$, halogenated alkaline earths and metals. For chloride-containing phosphors, a preferred precursor is a zinc sulfide containing 1 wt. % chlorine. Typical fluxes include $BaCl_2$, NaCl, $MgCl_2$, $ZnCl_2$ and mixtures thereof. A preferred flux is a mixture of NaCl, $BaCl_2$, and $MgCl_2$ which is added in an amount from about 2% to about 10% by weight of the mixture.

After the precursor materials have been combined, the mixture is fired in a first step at a temperature and for a time sufficient to form an activator-doped zinc sulfide having the hexagonal β-ZnS crystal structure. Preferably, the mixture is fired at a temperature from about 1050° C. to about 1400° C. for about 2 hours to about 8 hours. After cooling, the first-step fired material is washed to remove the flux, suspended in a liquid medium, and irradiated with ultrasound (e.g., 20 kHz, 600W–750W). Although other liquid media may be used, the preferred liquid medium is water. The ultrasonic irradiation of the suspension is continued until at least a portion of the first-step fired material is converted to a distorted hexagonal β-ZnS crystal form. In the experimental setup used herein, the period of ultrasonic irradiation was from about 10 minutes to about 90 minutes.

Figure 1:
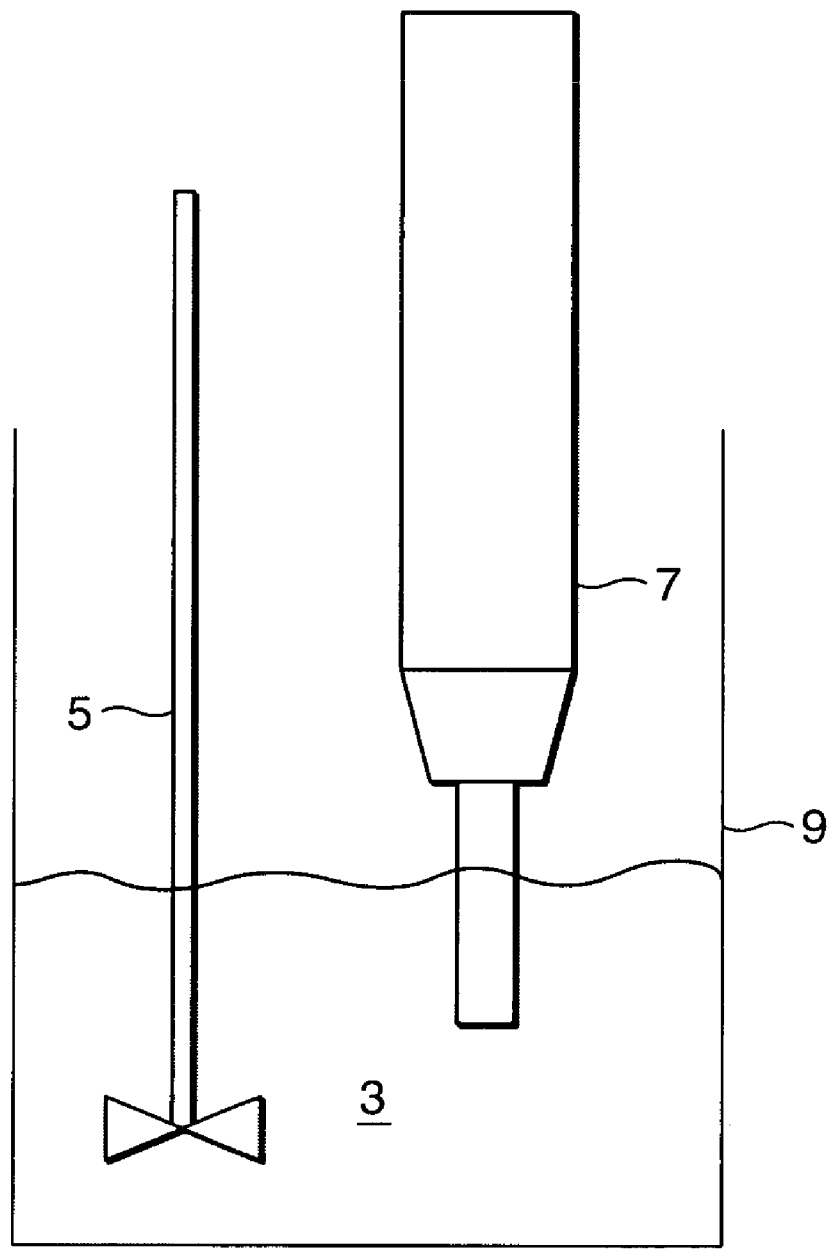
FIG. 1 is a schematic representation of an apparatus for ultrasonic irradiation.

The ultrasonic irradiation may be performed in a single container as in the experimental setup illustrated in FIG. 1. Here, the aqueous suspension 3 is placed in beaker 9 and the probe of the ultrasonic horn 7 is inserted into the suspension. The suspension is stirred by mixer 5 during the ultrasonic irradiation. The entire suspension is then irradiated until the desired amount of conversion is obtained. Such a system works well on a relatively small scale, but may not be as effective for large-scale manufacturing since the amount of suspension which can be effectively irradiated is limited by practical considerations such as the power of the ultrasonic transducer and the ability to circulate the suspension in larger containers.

Figure 5:
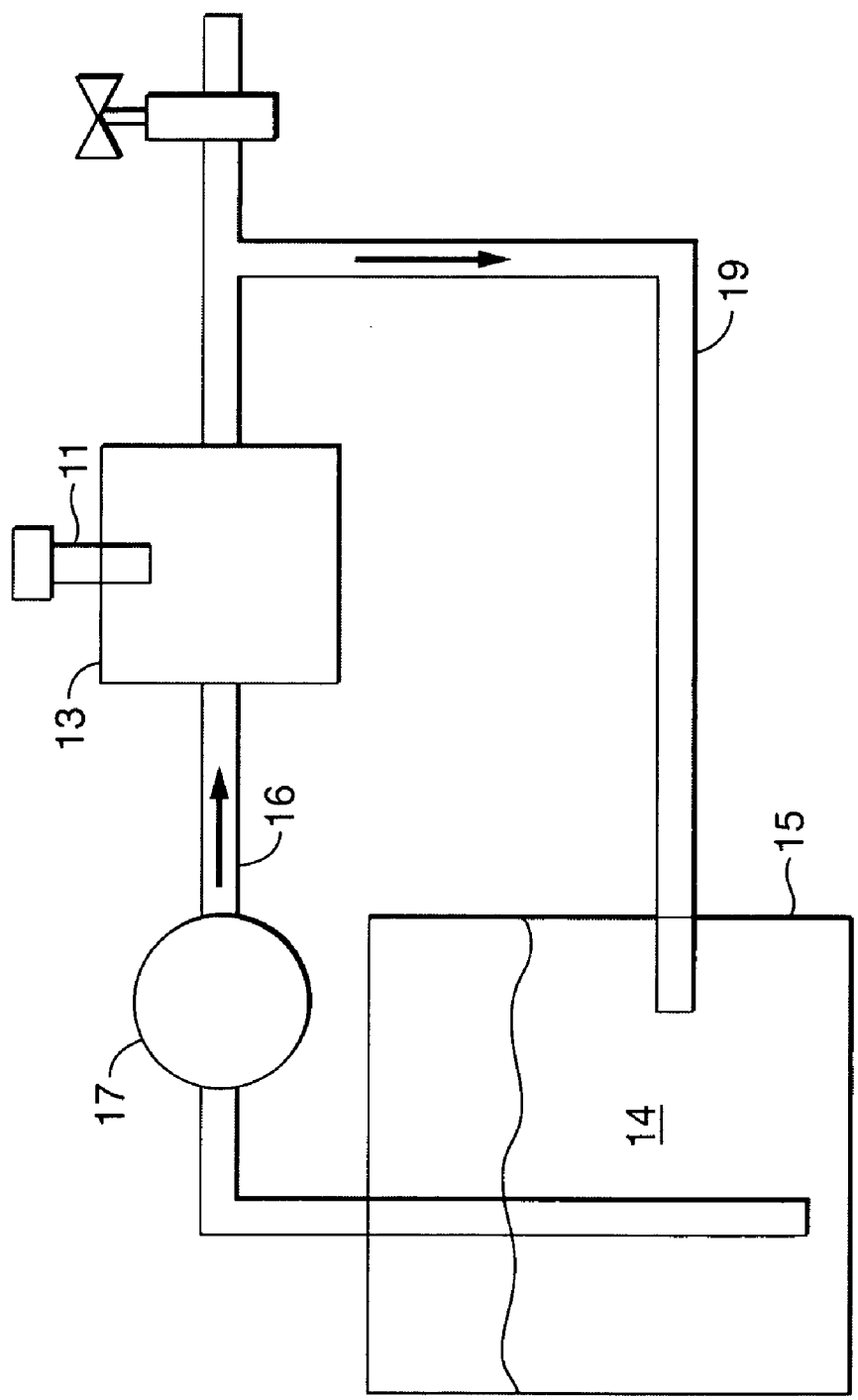
FIG. 5 is a schematic illustration of another embodiment of an apparatus for ultrasonic irradiation.

In another embodiment, the ultrasonic irradiation may be performed by circulating the suspension through a relatively small cell having an ultrasonic transducer. This is illustrated in FIG. 5. Circulating pump 17 pumps the suspension 14 out of the holding tank 15 and into cell 13 through line 16. The ultrasonic transducer 11 is positioned to irradiate only that portion of the suspension which passes through cell 13. At least a portion of the irradiated suspension is then returned to holding tank 15 through recirculating line 19. The suspension is continuously circulated through cell 13 until the desired amount of conversion is obtained. In this way, the acoustic energy of the transducer is concentrated in a smaller volume and only a portion of the suspension is being irradiated at a particular time. As a result, larger batches of material may be converted without resorting to more expensive high-power equipment which would make the process more economic for large-scale manufacturing.

After the first-fired material has been irradiated, a second-step firing is then used to substantially convert the first-step fired material to a cubic α-ZnS form. Preferably, the second-step firing is conducted at a temperature from about 500° C. to about 1000° C. for about 1 hour to about 5 hours. In the case of copper-activated phosphors, the first-step fired material is then blended with a prescribed amount of copper, preferably in the form of copper sulfate, before the second-step firing. The phosphor resulting from the second-step firing is then washed to remove residual reactants and undesirable byproducts.

The following examples are provided. These examples are intended to be illustrative and should not be construed as limiting the invention.

ZnS:Cu,Cl EL Phosphors

A quantity of 550.0 grams of chlorinated ZnS (about 1% by weight) is blended with 1.17 grams of anhydrous $CuSO_4$. This mixture is blended together with flux materials consisting of 3% $BaCl_2$, 3% $MgCl_2$ and 2% NaCl by weight. The blend is placed in covered crucibles and fired in a furnace at 1160° C. for 3.5 hours. The fired cakes are taken out of the furnace, cooled and washed with DI water to remove fluxes before drying in an oven. This first-step fired material which has the high temperature hexagonal β-ZnS crystallographic form is then suspended in water to form an aqueous slurry and subjected to sonification as shown in FIG. 1. The sonification is continued for a specified time and at an amplitude (intensity) to induce a partial change of the hexagonal form to a distorted hexagonal crystalline form.

The first-step fired material is then filtered, dried and sifted through a 100 mesh stainless steel sieve. To this, 3.9% $CuSO_4.5H_2O$ and 25.6% $ZnSO_4$ by weight is added and the combined material re-blended. The re-blended materials are placed in covered crucibles and fired in a second step at 730° C. for 2.25 hours.

This second-step fired material is washed twice with water, twice with acetic acid, and then several times with hot deionized (DI) water until the wash solution is free from acid. It is then washed with KCN and then with hot DI water to remove residual cyanide. The second-step fired material is then filtered, dried and sifted through a 325-mesh stainless steel sieve to form a finished phosphor.

Figure 2:
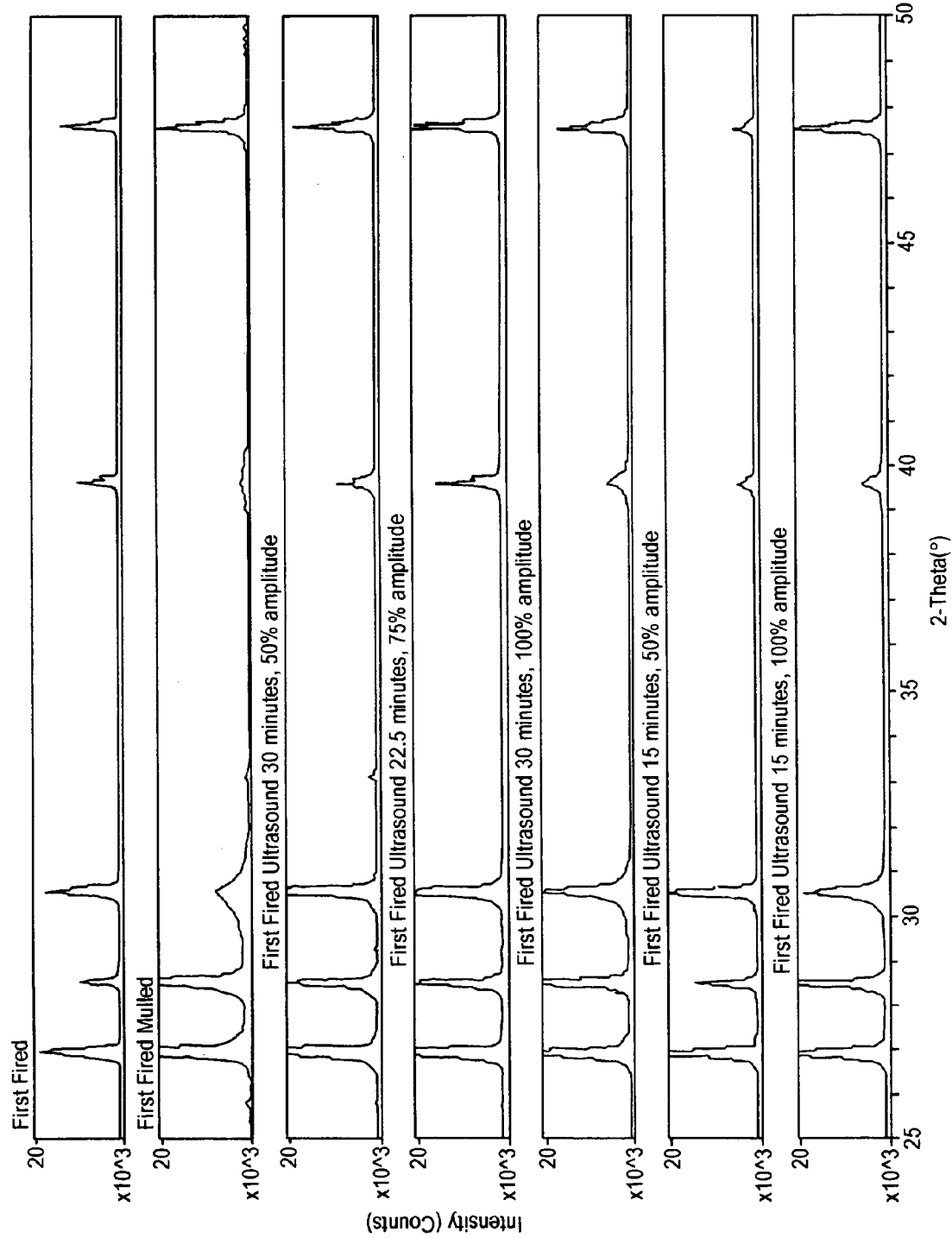
FIG. 2 is a set of x-ray diffraction patterns that illustrate the crystal structure changes effected by the ultrasonic irradiation.

FIG. 2 is a set of x-ray diffraction patterns of first-fired materials before and after various sonification conditions. The patterns demonstrate the partial change of a controlled part of the activator-doped zinc sulfide material from the high-temperature hexagonal β-ZnS crystallographic form to the distorted hexagonal crystalline form. This is characterized in particular by line broadening in the diffraction line around $2\theta=39.6°$. This change is to be contrasted with the pattern of a first-step fired material before ultrasonic irradiation (first pattern) and the pattern of a first-fired material after being subjected to a conventional mulling technique (second pattern). Unlike the controlled change demonstrated with sonochemistry, the mulled material exhibits gross changes in the shape of the diffraction lines at around $2\theta=30.5°$ and $39.6°$.

Figure 3:
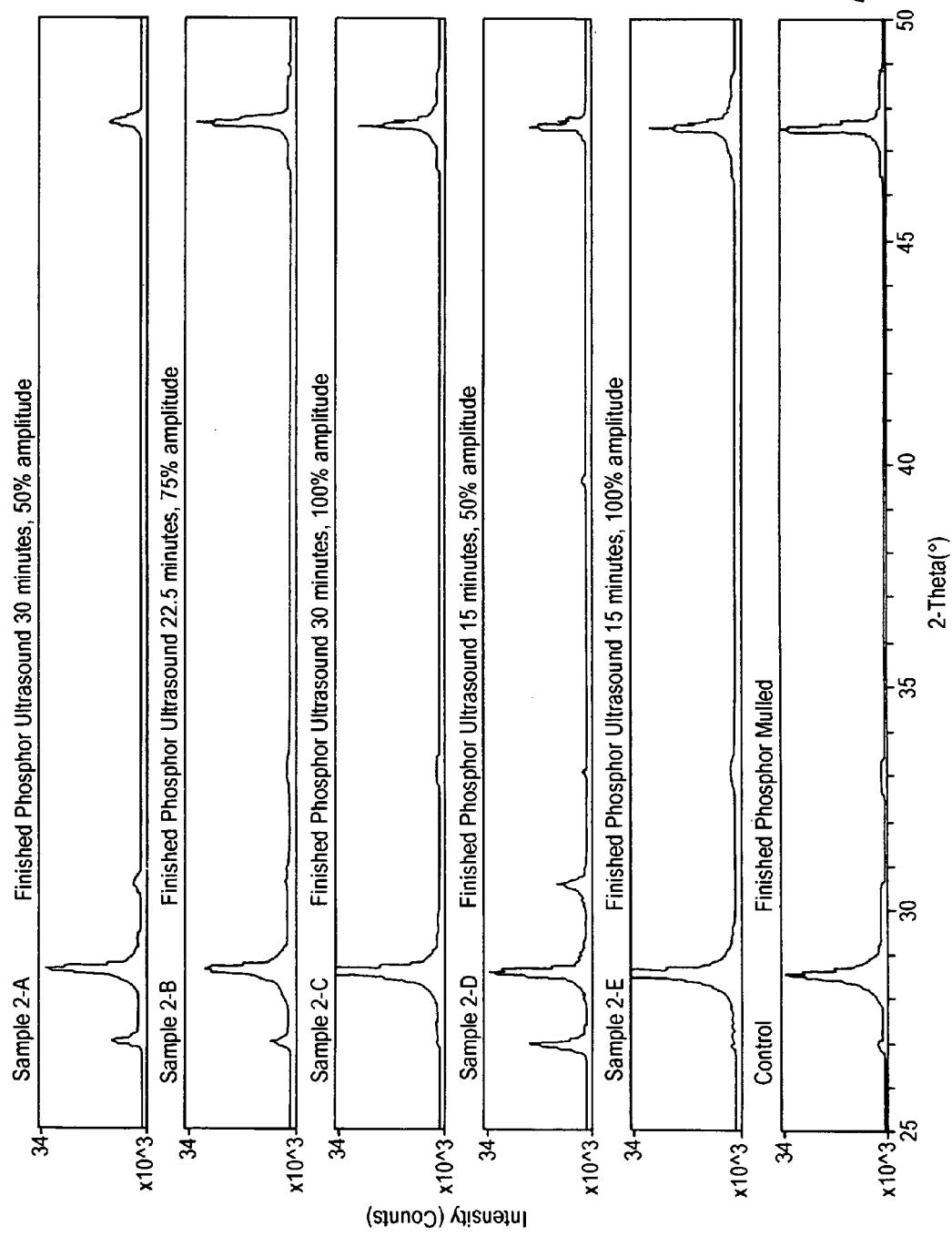
FIG. 3 is a set of x-ray diffraction patterns that illustrate the nearly complete conversion from the distorted, residually stressed hexagonal ZnS crystalline form to the final cubic ZnS form of the phosphor.

FIG. 3 is a set of x-ray diffraction patterns that show the change from the distorted high-temperature β-ZnS hexagonal crystalline structure to the low temperature α-ZnS form as a function of different sonification settings and the second-step firing. Finished phosphors were incorporated into conventional thick-film EL lamps and the performance results are given in Table 1. The lamps were laminated between sheets of a moisture-resistant ACLAM polymer film and operated at 100 volts, 400 Hz. The % cubic ratio in Table 1 is defined as the intensity at the 33.1° (2θ) cubic reflection divided by the sum of the intensity of the 33.1° (2θ) cubic reflection plus one-fifth of the intensity of the 26.9° (2θ) hexagonal reflection; $I(33.1°)/(I(33.1°)+I(26.9°)/5)$.

TABLE 1

| Sample | Sonification Time (min)** | % Cubic Ratio | Efficacy (lm/W) | 24 hr Brightness (ft.L) | x | y |
| --- | --- | --- | --- | --- | --- | --- |
| 1-A | 0 | 14 | 4.79 | 11.8 | 0.187 | 0.418 |
| 1-B | 15 | 32 | 5.97 | 30.8 | 0.186 | 0.447 |
| 1-C | 30 | 40 | 5.66 | 34.2 | 0.188 | 0.457 |
| 1-D | 45 | 76 | 3.96 | 33.3 | 0.189 | 0.462 |
| 1-E | 60 | 73 | 4.65 | 30.4 | 0.189 | 0.460 |
| Control* | mulled | 76 | 4.45 | 30.8 | 0.190 | 0.467 |

Figure 4:
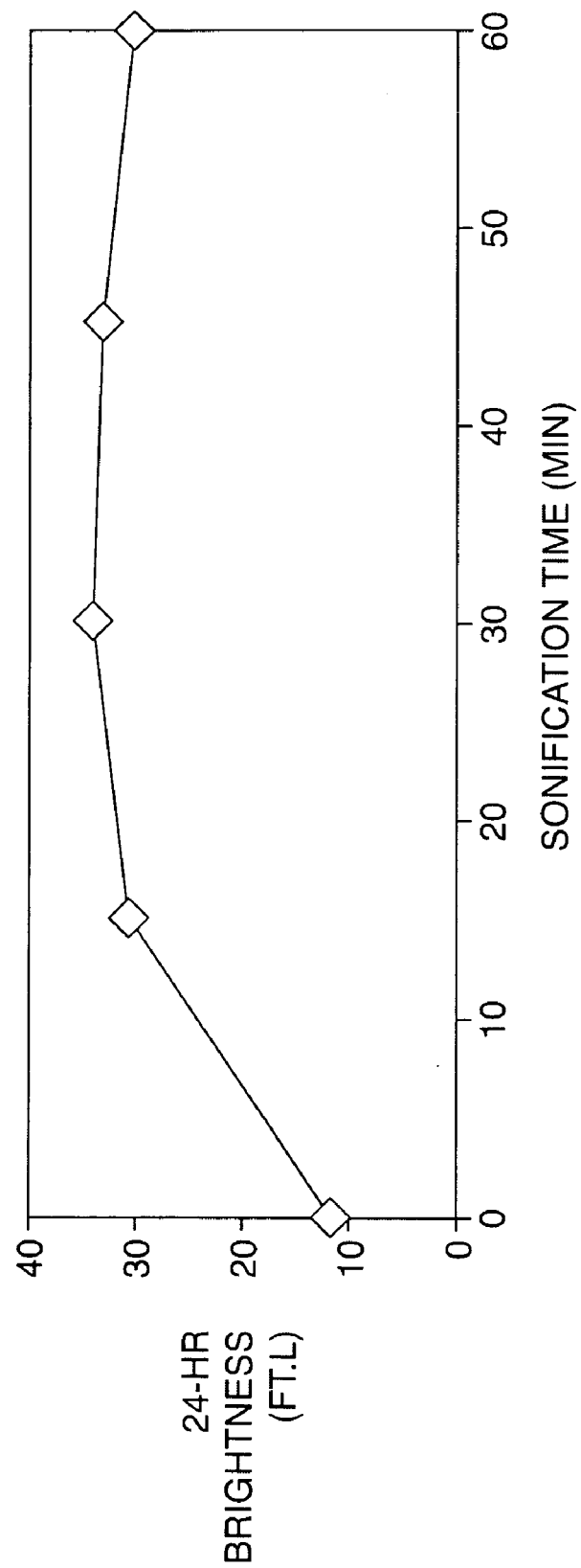
FIG. 4 is a plot of the performance several phosphors produced with different sonification times and a constant sonification amplitude.

*Control sample was prepared by a conventional, low-intensity milling (mulling) treatment.
**Ultrasonic Processor, Model GE600, probe #V1A (Sonics & Materials, Newton, CT); 600 watts, 20 kHz A plot of these data is shown in FIG. 4. The optimum sonification time appears around 30 to 45 minutes with an improvement in the measured brightness of from 8% to 11%.

Table 2 represents the effect of the different sonification times and amplitudes (in terms of % useful intensity of the sonification unit). Using this experimental setup, the 24-hour brightness (in ft.L), maintenance (24 hr. brightness/100 hr. brightness), and efficacy all appear to be optimal at 30 minutes and 100% intensity. Moreover, the data show that the method of this invention is capable of producing EL phosphors having better performance characteristics than those made the prior art method.

TABLE 2

| | Sonification Time (min)** | Intensity (%) | Screen Print Lamp Data* | | | | | |
| --- | --- | --- | --- | --- | --- | --- | --- | --- |
| Sample | | | 2 hr Bright. (ft.L) | 24 hr Bright. (ft.L) | Maintenance | Efficacy (lm/W) | x | y |
| 2-A | 30 | 50 | 20.1 | 15.5 | 0.77 | 3.87 | 0.172 | 0.411 |
| 2-B | 22.5 | 75 | 25.3 | 21.5 | 0.85 | 4.04 | 0.177 | 0.434 |
| 2-C | 30 | 100 | 28.3 | 25.3 | 0.89 | 4.43 | 0.184 | 0.421 |
| 2-D | 15 | 50 | 16 | 12 | 0.75 | 3.70 | 0.173 | 0.402 |
| 2-E | 15 | 100 | 26.6 | 23.5 | 0.88 | 4.39 | 0.185 | 0.441 |
| control | mulled | — | 26.8 | 23.9 | 0.89 | 3.51 | 0.181 | 0.443 |

*Data from screen-printed lamps analogous to commercial EL lamps.
**Vibra Cell, Model VC750, probe #CV33 (Sonics & Materials, Newton, CT); 750 watts, 20 kHz While there have been shown and described what are at present considered to be the preferred embodiments of the invention, it is anticipated that the conditions for achieving the optimal conditions will vary depending on such factors as the frequency and intensity of the ultrasound, the composition of the liquid medium, the amount and type of material acted upon, and the geometry of the container. However, such variations are readily apparent and within the skill of those in the art. It will therefore be appreciated that various changes and modifications may be made without departing from the scope invention as defined by the appended claims.

We claim:
1. A method of making of zinc sulfide-based electroluminescent phosphors, comprising:
   a) firing a mixture of zinc sulfide, at least one activator, and a flux to form a first-fired material having a hexagonal β-ZnS crystal structure;
   b) suspending the first-fired material in a liquid medium;
   c) at least partially converting the crystal structure of the first-fired material to a distorted hexagonal β-ZnS form by ultrasonic irradiation of the suspension; and
   d) firing the at least partially converted first-fired material to form an electroluminescent phosphor.

2. The method of claim 1 wherein said mixture is fired at a temperature from about 1050° to about 1400° C. for about 2 hours to about 8 hours.

3. The method of claim 1 wherein the suspension is ultrasonically irradiated from about 10 minutes to about 90 minutes.

4. The method of claim 2 wherein mixture contains copper and chlorine.

5. The method of claim 4 wherein the first-fired material is blended with a source of copper after the ultrasonic irradiation and prior to the second firing.

6. The method of claim 5 wherein the blended material is fired at a temperature from about 500° C. to about 1000° C. for about 1 to 5 hours.

7. The method of claim 2 wherein the at least partially converted first-fired material is fired at a temperature from about 500° C. to about 1000° C. for about 1 to 5 hours.

8. The method of claim 1 wherein the first-fired material is suspended in water and the ultrasound has a frequency of 20 kHz.

9. The method of claim 1 wherein the suspension containing the first-fired material is circulated through a cell having an ultrasonic transducer.

10. The method of claim 9 wherein at least a portion of the suspension is recirculated through the cell.

11. A method of making of zinc sulfide-based electroluminescent phosphors, comprising:
 a) firing a mixture of zinc sulfide, at least one activator, and a flux at a temperature from about 1050° to about 1400° C. for about 2 hours to about 8 hours to form a first-fired material having a hexagonal β-ZnS crystal structure;
 b) suspending the first-fired material in a liquid medium;
 c) at least partially converting the crystal structure of the first-fired material to a distorted hexagonal β-ZnS form by ultrasonic irradiation of the suspension; and
 d) firing the at least partially converted first-fired material at a temperature from about 500° C. to about 1000° C. for about 1 to 5 hours to form a zinc sulfide-based electroluminescent phosphor having a cubic β-ZnS crystal form.

12. The method of claim 11 wherein the phosphor is activated with copper.

13. The method of claim 12 wherein the first-fired material is blended with a source of copper after the ultrasonic irradiation and prior to the second firing.

14. The method of claim 11 the first-fired material is suspended in water and the ultrasound has a frequency of 20 kHz.

* * * * *